(12) United States Patent
Bartnikowski et al.

(10) Patent No.: US 9,471,456 B2
(45) Date of Patent: Oct. 18, 2016

(54) INTERLEAVED INSTRUCTION DEBUGGER

(71) Applicant: NVIDIA Corporation, Santa Clara, CA (US)

(72) Inventors: Stephen Bartnikowski, San Jose, CA (US); Arthur Danskin, Los Angeles, CA (US); Gerald Luiz, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/895,266

(22) Filed: May 15, 2013

(65) Prior Publication Data
US 2014/0344556 A1 Nov. 20, 2014

(51) Int. Cl.
G06F 9/44 (2006.01)
G06F 11/34 (2006.01)
G06F 11/36 (2006.01)
G06F 11/30 (2006.01)
G06F 11/00 (2006.01)

(52) U.S. Cl.
CPC .............. *G06F 11/34* (2013.01); *G06F 11/00* (2013.01); *G06F 11/30* (2013.01); *G06F 11/3466* (2013.01); *G06F 11/36* (2013.01); *G06F 11/362* (2013.01)

(58) Field of Classification Search
CPC ..................................... G06F 11/34–11/3696
See application file for complete search history.

(56) References Cited

U.S. PATENT DOCUMENTS

| | | |
|---|---|---|
| 5,643,086 A | 7/1997 | Alcorn et al. |
| 5,752,062 A | 5/1998 | Gover et al. |
| 5,757,919 A | 5/1998 | Herbert et al. |
| 5,815,154 A | 9/1998 | Hirschtick et al. |
| 5,892,904 A | 4/1999 | Atkinson et al. |
| 5,920,725 A | 7/1999 | Ma et al. |
| 5,970,147 A | 10/1999 | Davis |
| 5,978,484 A | 11/1999 | Apperson et al. |
| 5,999,737 A | 12/1999 | Srivastava |
| 6,016,474 A | 1/2000 | Kim et al. |
| 6,157,618 A | 12/2000 | Boss et al. |
| 6,266,416 B1 | 7/2001 | Sigbj.o slashed.rnsen et al. |
| 6,282,701 B1* | 8/2001 | Wygodny ........... G06F 11/3466 702/183 |
| 6,330,008 B1 | 12/2001 | Razdow et al. |
| 6,362,825 B1 | 3/2002 | Johnson |
| 6,412,039 B1 | 6/2002 | Chang |
| 6,668,325 B1 | 12/2003 | Collberg et al. |
| 6,684,389 B1 | 1/2004 | Tanaka et al. |

(Continued)

OTHER PUBLICATIONS

Narayanasamy, Satish, et al., "BugNet: Continuously Recording Program Execution for Deterministic Replay Debugging", 2005, pp. 1-12.*

(Continued)

*Primary Examiner* — Thuy Dao
*Assistant Examiner* — Christopher Franco

(57) ABSTRACT

One or more embodiments of the invention are directed to a method including monitoring execution of a set of programs each including a set of instructions executing interleaved with other instructions of the set of instructions, where each of the set of instructions includes at least one operation operating on a set of threads; organizing a first set of instructions corresponding to a first program of the set of programs based on an execution order of the first set of instructions; generating a result set representing the first set of instructions organized based on the execution order; and displaying the result set.

20 Claims, 9 Drawing Sheets

(56) References Cited

U.S. PATENT DOCUMENTS

| | | |
|---|---|---|
| 6,732,060 B1 | 5/2004 | Lee |
| 6,901,582 B1 | 5/2005 | Harrison |
| 6,943,800 B2 | 9/2005 | Taylor et al. |
| 6,965,994 B1 | 11/2005 | Brownell et al. |
| 7,016,972 B2 | 3/2006 | Bertram et al. |
| 7,047,519 B2 | 5/2006 | Bates et al. |
| 7,095,416 B1 | 8/2006 | Johns et al. |
| 7,107,484 B2 | 9/2006 | Yamazaki et al. |
| 7,173,635 B2 | 2/2007 | Amann et al. |
| 7,237,151 B2 | 6/2007 | Swoboda et al. |
| 7,260,066 B2 | 8/2007 | Wang et al. |
| 7,277,826 B2 | 10/2007 | Castelli et al. |
| 7,383,205 B1 | 6/2008 | Peinado et al. |
| 7,395,426 B2 | 7/2008 | Lee et al. |
| 7,401,116 B1 | 7/2008 | Chalfin et al. |
| 7,401,242 B2 | 7/2008 | Abernathy et al. |
| 7,420,563 B2 | 9/2008 | Wakabayashi |
| 7,505,953 B2 | 3/2009 | Doshi |
| 7,555,499 B2 | 6/2009 | Shah et al. |
| 7,739,667 B2* | 6/2010 | Callahan, II ........ G06F 11/3404 717/127 |
| 7,765,500 B2 | 7/2010 | Hakura et al. |
| 7,778,800 B2 | 8/2010 | Aguaviva et al. |
| 7,891,012 B1 | 2/2011 | Kiel et al. |
| 8,276,124 B2* | 9/2012 | Maennel ............ G06F 11/3604 717/125 |
| 8,316,355 B2* | 11/2012 | Feng et al. .................... 717/135 |
| 8,436,864 B2 | 5/2013 | Aguaviva et al. |
| 8,436,870 B1 | 5/2013 | Aguaviva et al. |
| 8,443,340 B2* | 5/2013 | Stairs .................... G06F 11/362 717/100 |
| 8,448,002 B2 | 5/2013 | Bulusu et al. |
| 8,452,981 B1 | 5/2013 | Kiel et al. |
| 8,607,151 B2 | 12/2013 | Aguaviva et al. |
| 8,701,091 B1* | 4/2014 | Wloka .................. G06F 9/4443 717/125 |
| 2001/0034835 A1 | 10/2001 | Smith |
| 2001/0044928 A1 | 11/2001 | Akaike et al. |
| 2002/0157086 A1 | 10/2002 | Lewis et al. |
| 2002/0175839 A1 | 11/2002 | Frey |
| 2003/0043022 A1 | 3/2003 | Burgan et al. |
| 2003/0120935 A1 | 6/2003 | Teal et al. |
| 2003/0214660 A1 | 11/2003 | Plass et al. |
| 2004/0085894 A1 | 5/2004 | Wang et al. |
| 2004/0158824 A1 | 8/2004 | Gennip et al. |
| 2004/0162989 A1 | 8/2004 | Kirovski |
| 2005/0198051 A1 | 9/2005 | Marr et al. |
| 2005/0222881 A1 | 10/2005 | Booker |
| 2005/0243094 A1* | 11/2005 | Patel .................... G06T 15/005 345/506 |
| 2005/0273652 A1* | 12/2005 | Okawa ................... G06F 9/505 714/10 |
| 2005/0278684 A1 | 12/2005 | Hamilton et al. |
| 2006/0047958 A1 | 3/2006 | Morais |
| 2006/0079333 A1 | 4/2006 | Morrow et al. |
| 2006/0080625 A1 | 4/2006 | Bose et al. |
| 2006/0109846 A1 | 5/2006 | Lioy et al. |
| 2006/0152509 A1 | 7/2006 | Heirich |
| 2006/0161761 A1 | 7/2006 | Schwartz et al. |
| 2006/0185017 A1 | 8/2006 | Challener et al. |
| 2006/0242627 A1* | 10/2006 | Wygodny ........... G06F 11/3636 717/128 |
| 2007/0115292 A1* | 5/2007 | Brothers .............. G06F 9/3879 345/506 |
| 2007/0274284 A1 | 11/2007 | Dendukuri et al. |
| 2008/0007563 A1* | 1/2008 | Aronson ................. G06T 15/00 345/589 |
| 2008/0034351 A1* | 2/2008 | Pugh ...................... G06F 11/36 717/128 |
| 2008/0095090 A1 | 4/2008 | Lee et al. |
| 2008/0098207 A1* | 4/2008 | Reid ................... G06F 11/3636 712/227 |
| 2008/0162272 A1* | 7/2008 | Huang ................ G06F 11/3409 717/127 |
| 2008/0320437 A1* | 12/2008 | Maennel ....................... 717/105 |
| 2009/0031290 A1* | 1/2009 | Feng ....................... G06F 8/456 717/126 |
| 2009/0307660 A1* | 12/2009 | Srinivasan .............. G06F 8/314 717/114 |
| 2010/0211933 A1* | 8/2010 | Kiel .................... G06F 11/3636 717/125 |
| 2010/0242025 A1* | 9/2010 | Yamazaki ........... G06F 11/3476 717/127 |
| 2012/0151183 A1* | 6/2012 | Guilford ............... G06F 9/3851 712/22 |
| 2012/0185730 A1* | 7/2012 | Moran ................ G06F 11/3648 714/37 |
| 2013/0007536 A1* | 1/2013 | Feng et al. ........................ 714/45 |
| 2013/0297978 A1* | 11/2013 | Jalbert ............... G06F 11/3632 714/49 |
| 2013/0332906 A1* | 12/2013 | Razavi ................ G06F 11/3684 717/124 |
| 2014/0019984 A1* | 1/2014 | Li .......................... G06F 9/5027 718/102 |
| 2014/0366006 A1* | 12/2014 | Gottschlich ......... G06F 11/3664 717/125 |

OTHER PUBLICATIONS

Zamfir, Cristian, et al., "Execution Synthesis: A Technique for Automated Software Debugging", 2010, pp. 321-334.*
Dunlap, George W., et al., "Execution Replay for Multiprocessor Virtual Machines", 2008, pp. 121-130.*
Montesinos, Pablo, et al., "DeLorean—Recording and Deterministically Replaying Shared-Memory Multiprocessor Execution Efficiency", 2008, pp. 289-300.*
Nagarakatte, Santosh, et al., "Multicore Acceleration of Priority-Based Schedulers for Concurrency Bug Detection", 2012, pp. 543-554.*
Ferrara, Pietro, et al., "Static analysis of the determinism of multithreaded programs", 2008, pp. 41-50.*
Lee, Yann-Hang, et al., "Replay Debugging for Multi-threaded Embedded Software", 2010, pp. 15-22.*
Carver, Richard H., et al., "Modern Multithreading: Monitoring", 2006, pp. 177-243.*
Vianney, Duc, et al., "Performance Analysis and Visualization Tools for Cell/B.E. Multicore Environment", 2008, pp. 1-12.*
Segovia, B., et al., "Non-interleaved Deferred Shading of Interleaved Sample Patterns", 2006, pp. 1-9.*
Li, Zheng, et al., "A Novel Parallel Traffic Control Mechanism for Cloud Computing", 2010, pp. 376-382.*
Hawick, K.A., et al., "Parallel Algorithms for Hybrid Multi-core CPU-GPU Implementations of Component Labelling in Critical Phase Models", 2013, pp. 1-7.*
Rau, Martina A., et al., "Interleaved practice in multi-dimensional learning tasks: Which dimension should we interleave?", 2013, pp. 98-114.*
Du, Peng, et al., "From CUDA to OpenCL: Towards a performance-portable solution for multi-platform GPU programming", 2011, pp. 391-407.*
Maheswara, Gowritharan, et al., "TIE: An Interactive Visualization of Thread Interleavings", 2010, pp. 215-216.*
Wu, Ren et al., "Clustering Billions of Data Points Using GPUs", 2009, pp. 1-5.*
Maniatakos, Michail, et al., "Vulnerability-based Interleaving for Multi-Bit Upset (MBU) protection in modern microprocessors", 2012, pp. 1-8.*
GPU Performance Optimization with NVPerfHUD. NVPerfHUD 4.0. A Heads-Up Display for Performance Analysis. NVIDIA Corporation, May 2006, Downloaded on Aug. 24, 2012 in archive.org under the following URL associated with a capture of Jul. 20, 2006: http://weg.archive.org/weg/20060720222056/http://developer.nvidia.com/object/nvperfhud_home.html.
Kiel, J. [et al.]: NVIDIA Performance Tools. Slides presented during the lecture given on the occasion of the Game Developers Conference in Mar. 2006, Downloaded on Aug. 28, 2012 in archive.org under the following URL associated with a capture of May 26,

(56) References Cited

OTHER PUBLICATIONS

2006: http://web.archive.org/web/20060526023128/http://download.nvidia.com/developer/presentations/2006/gdc/2006-GDC-Performance-Tools.pdf.

Online-Information on NVPerfHUD 4 in archive.org dated Jul. 20, 2006, URL: http://web.archive.org/web/20060720222056/http://developer.nvidia.com/object/nvperfhud_home.html, [search carried out on Aug. 24, 2012].

Entry on Wikipedia dated Oct. 7, 2006 regarding the term "Debugger", URL:http://en.wikipedia.org/w/index.php?title=Debugger&oldid=63069774, [search carried out on Aug. 27, 2012].

gDEBugger, graphicREMEDY, http://www.gremedy.com/, Jul. 29, 2005.

Jeffrey K. Hollingsworth and Barton P. Miller, "Dynamic Control of Performance Monitoring on Large Scale Parallel Systems", Jul. 23, 1993, ACM, International Conference on Supercomputing: Proceedings of the 7th International Conference on Supercomputing, pp. 185-194.

Dror G. Feitelson and Larry Rudolph, "Toward Convergence in Job Scheduling for Parallel Supercomputers", Aug. 1996, Springer, Job Scheduling Strategies for Parallel Processing: IPPS '96 Workshop Hololulu, Hawaii, Apr. 16, 1996 Proceedings.

Josh Lessard, "Profiling Concurrent Programs Using Hardware Counters", May 2005, University of Waterloo, Thesis, (abridged copy provided).

C. Cebenoyan and M. Wloka, "optimizing the graphics pipeline", 2003, Nvidia GDC Presentation Slide.

N. Tatarchuk, "New RenderMonkey Features for DirectX and OpenGL Shader Development", Game Developers Conference, Mar. 2004.

"ATI RADEON X800, 3D Architecture White Paper", ATI, 2005, pp. 1-13, with proof of seniority (4 pages), according to ACM bibliograghy regarding the document: "The Direct3D 10 System", ACM TOG, vol. 25, Iss. 3 (Jul. 2006).

"maxVUE Grapic Editor", Metso Automation, 2005, pp. 1-6, http://www.metsoautomation.com/automation/indes.nsf/FR?Readform&ATL=automation/ed_prod_nsf/WebWID/WTB-041110-22256F-2445A.

A Relational Debugging Engine for the Graphics Pipeline, Duca et al., http://citeseer.ist.psu.edu/cache/papers/ cs2/167/http:zSZzSzwww.cs.jhu.eduzSz~cohensSzPublicationszSzgldb.pdf/a-relational-debugging-engine.pdf International Conference on Computer Graphics and Interactive Techniques, ACM SIGGRAPH 2005, pp. 453-463, LA, ISSN: 0730-0301.

\* cited by examiner

FIG. 6A

| | | | # [ 0][00d060] | | | | | |
|---|---|---|---|---|---|---|---|---|
| Line 1: | [c 4: w 0] | IMAD.U32.U32 | R0, R0, c[0x7][0x8000], R1; | | | | | |
| Line 2: | [c 4: w 0] + IMAD | Read R0 | 0 | 0 | 0 | 0 | 0 | 0 |
| Line 3: | [c 4: w 0] + IMAD | Read R1 | 0x1 | 0 | 0x3 | 0x4 | 0x5 | 0x6 |
| Line 4: | [c 4: w 0] + IMAD | Write R0 | 0x2 | 0 | 0x3 | 0x4 | 0x5 | 0x6 |

FIG. 6B

| | | | # [ 0][00df68] | | | | | |
|---|---|---|---|---|---|---|---|---|
| Line 1: | [c 4: w 0] | STS.64 | [R2], R4; | | | | | |
| Line 2: | [c 4: w 0] + STS | Read R2 | 0x8 | 0x10 | 0x18 | 0x20 | 0x28 | 0x30 |
| Line 3: | [c 4: w 0] + STS | Read R4 | 0 | 0 | 0 | 0 | 0 | 0 |
| Line 4: | [c 4: w 0] + STS | Read R5 | 0 | 0 | 0 | 0 | 0 | 0 |
| Line 5: | [c 4: w 0] + STS | Write Shared Addr 0 | 0x8 | 0x10 | 0x18 | 0x20 | 0x28 | 0x30 |
| Line 6: | [c 4: w 0] + STS | Write Shared Data 0 | 0 | 0 | 0 | 0 | 0 | 0 |
| Line 7: | [c 4: w 0] + STS | Write Shared Addr 0x4 | 0xc | 0x14 | 0x1c | 0x24 | 0x2c | 0x34 |
| Line 8: | [c 4: w 0] + STS | Write Shared Data 0 | 0 | 0 | 0 | 0 | 0 | 0 |

```
[c 0: w 13: clk 2607: sm 13]         IADD32I       R1, R4, 0x1;
[c 0: w 13: clk 2607: sm 13] + IADD32I    Read R4   0x40      -        -        # [ 6][000030]   -   -
[c 0: w 13: clk 2607: sm 13] + IADD32I    Write R1  0x41      -        -                         -   -
```

FIG. 6C

```
[c 0: w 0]          ST.E.CG.64         [R26], R30;
[c 0: w 0] + ST     Read R28           0x5eb100       0x5eb100       0x5eb100       # [ 68][000220]
[c 0: w 0] + ST     Read R29           0x1            0x1            0x1            0x5eb100
[c 0: w 0] + ST     Read R30           0x5ef200       0x5ef200       0x5ef200       0x1
[c 0: w 0] + ST     Read R31           0x1            0x1            0x1            0x5ef200
[c 0: w 0] + ST     Write Global Addr  0x1005eb100    0x1005eb100    0x1005eb100    0x1
[c 0: w 0] + ST     Write Global Data  0x5ef200       0x5ef200       0x5ef200       0x1005eb100
[c 0: w 0] + ST     Write Global Addr  0x1005eb104    0x1005eb104    0x1005eb104    0x5ef200
[c 0: w 0] + ST     Write Global Data  0x1            0x1            0x1            0x1005eb104
                                                                                    0x1

[c 0: w 1]          ST.E              [R24 + 0x10], R26;
[c 0: w 1] + ST     Read R24           0x618020       0x618020       0x618020       # [288][000900]
[c 0: w 1] + ST     Read R25           0x1            0x1            0x1            0x618020
[c 0: w 1] + ST     Read R26           0              0              0              0x1
[c 0: w 1] + ST     Write Global Addr  0x100618030    0x100618030    0x100618030    0x100618030
[c 0: w 1] + ST     Write Global Data  0              0              0              0
```

FIG. 6D

INTERLEAVED INSTRUCTION DEBUGGER

BACKGROUND OF THE INVENTION

A debugger or debugging tool is a computer program that may be used to test and debug other programs. The code to be examined might be running on an instruction set simulator, a technique that may allow greater control in its ability to halt when specific conditions are encountered, but which will typically be somewhat slower than executing the code directly on the appropriate or the same processor. Some debuggers offer two modes of operation, full or partial simulation, to limit this impact.

A program may include one or more bugs that cause the program to execute improperly (e.g., causing the program to behave undesirably, provide incorrect results, crash entirely, etc.). A debugger may monitor characteristics of a program while the program executes and provide diagnostic information to a user in order to investigate the cause or symptoms of a bug in the program. For example, a debugger may indicate the different values of a memory location as a result of instructions and operations that may cause the value of the memory location to change.

Conventional debuggers show data read and written, to and from memory or registers, in order to help software developers better understand how the computer is executing their programs. Debuggers may generally present such data live, or as the program executes. A developer has the option to step through the source code, instruction by instruction, per thread of execution. The developer sees only a snapshot of the current state of the computer (e.g., values in memory, location in the program, and the active thread). Aside from the program stack trace, all context must be tracked manually by the developer.

Processors (e.g., Graphics Processing Units (GPUs), Central Processing Units (CPUs), etc) may process many programs, instructions, threads, and so on in parallel. Many logical contexts may be executing in parallel or otherwise interleaved. For example, modern GPU's execute programs simultaneously on several independent streaming multiprocessors (SM). Each SM is capable of simultaneously executing multiple cooperative thread arrays (CTAs), each warp of which may include multiple threads (e.g., 16 threads, 32 threads, 64 threads, etc). CTAs, warps, and/or threads can have interdependence on other threads and warps on the SM, and the order and interleaving of instruction execution from multiple other threads can be critical in understanding execution errors in programs running on an SM. Conventional processes of executing simulations of program(s) and debugging contexts of execution become more complicated with the parallel context information.

For example, an SM may execute an instruction of a first program. However, before executing a second instruction of the first program, the SM may execute one or more instructions of one or more other programs (e.g., 100 other instructions, 1,000 other instructions, and so on). The SM may eventually return to executing one or more instructions of the first program. Further, the SM may execute threads, warps, CTAs, and/or programs interleaved and/or in a multi-threaded fashion. A debugger may have difficulty following the execution of the first program because the debugging data associated with one or more instructions of one or more other programs may be interleaved with the debugging data of the first program.

BRIEF SUMMARY OF THE INVENTION

Accordingly, one or more embodiments of the invention are directed to a method including monitoring execution of a set of programs each including a set of instructions executing interleaved with other instructions of the set of instructions, where each of the set of instructions includes at least one operation operating on a set of threads; organizing a first set of instructions corresponding to a first program of the set of programs based on an execution order of the first set of instructions; generating a result set representing the first set of instructions organized based on the execution order; and displaying the result set.

One or more embodiments of the invention are directed to a system including a tracker configured to monitor execution of a set of programs each including a set of instructions executing interleaved with other instructions of the set of instructions, where each of the set of instructions includes at least one operation operating on a set of threads; and an aggregator configured to: organize a first set of instructions corresponding to a first program of the set of programs based on an execution order of the first set of instructions; generate a result set representing the first set of instructions organized based on the execution order for display on a display.

One or more embodiments of the invention are directed to non-transitory computer-readable storage medium including a set of instructions configured to execute on at least one computer processor and including functionality to: monitor execution of a set of programs each including a set of sub-instructions executing interleaved with other sub-instructions of the set of sub-instructions, where each of the set of sub-instructions includes at least one operation operating on a set of threads; organize a first set of sub-instructions corresponding to a first program of the set of programs based on an execution order of the first set of sub-instructions; generate a result set representing the first set of sub-instructions organized based on the execution order; and display the result set.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 6A-6D show exemplary output of a debugger program simulation, according to an embodiment of the present invention.

DETAILED DESCRIPTION OF THE INVENTION

Figure 1:
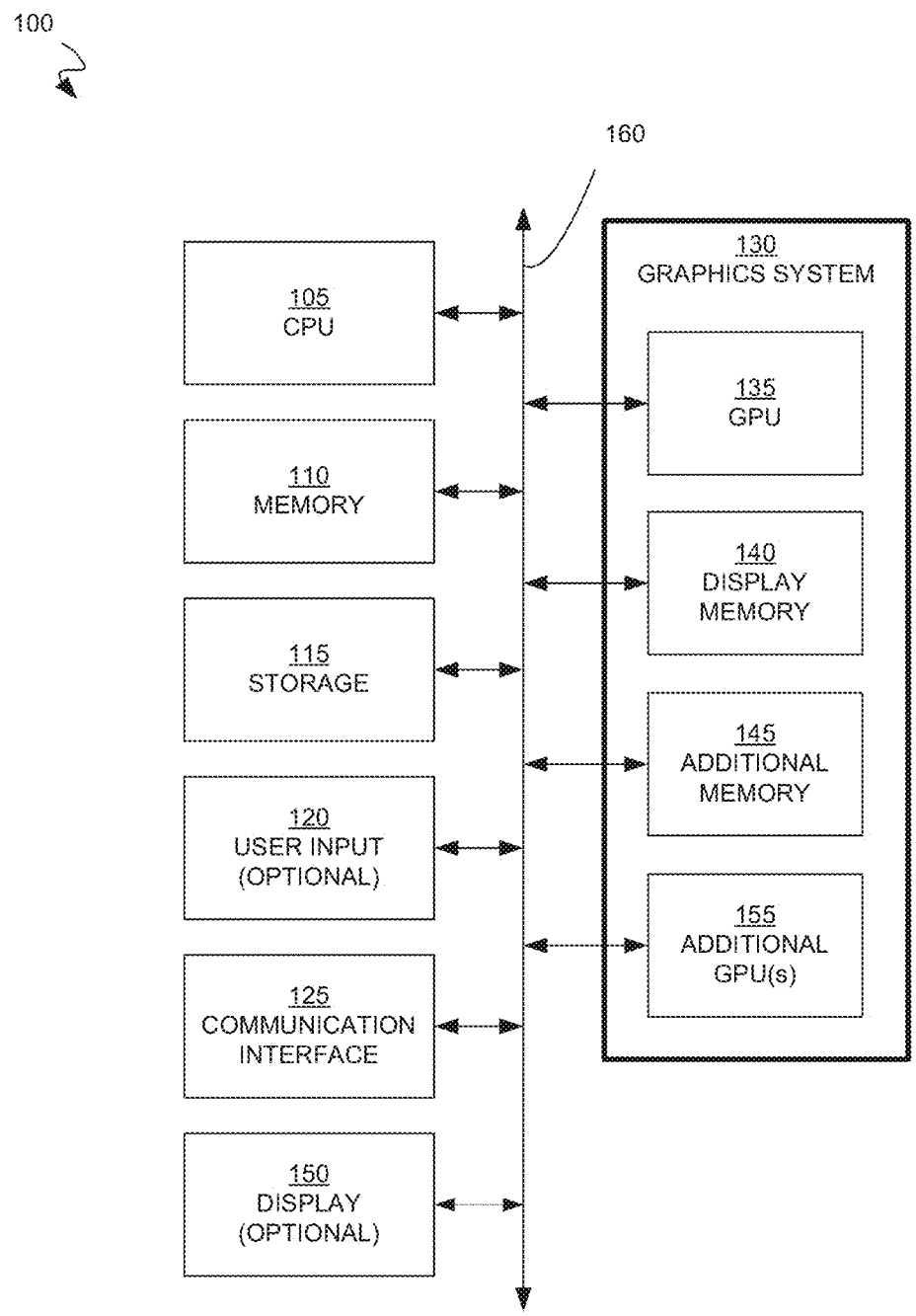
FIG. 1 is a block diagram of an example of a computer system capable of implementing embodiments according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "generating," "sending," "decoding," "encoding," "accessing," "streaming," or the like, refer to actions and processes (e.g., flowchart 700 of FIG. 7) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computer system 100 capable of implementing embodiments according to the present invention. In the example of FIG. 1, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including the Internet. The optional display device 150 may be any device capable of displaying visual information in response to a signal from the computer system 100. The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. The physical GPU 135 can be configured as multiple virtual GPUs that may be used in parallel (concurrently) by a number of applications executing in parallel.

Graphics memory may include a display memory 140 (e.g., a framebuffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

For example, a computer program for organizing and displaying execution debugging data may be stored on the computer-readable medium and then stored in system memory 110 and/or various portions of storage device 115. When executed by the processor 105, the computer program may cause the processor 105 to perform and/or be a means for performing the functions required for carrying out the organizing and displaying execution debugging data processes discussed above.

In order to organize the complex interaction from one or more programs, one or more simulations of programs, or execution of one or more programs on a processor, in one or more embodiments of the invention, a debugger program monitors register and memory operations (e.g., reads and writes), and tracks which warps, instructions, CTAs, and/or programs threads belong. The debugger program may be an offline debugger. An offline debugger does not perturb actual execution of one or more programs. As the debugger program accumulates execution data associated with a simulation or execution of the program, it may organize the execution data by execution order, and aggregates all warp data together for each instruction. The debugger program may then store the organized execution data (e.g., write the execution to a storage drive in the form of a flat text file).

Embodiments of the present invention allow for presenting execution data in an organized and simplified fashion, for example for each instruction, all data read and written to registers or memory. In addition, embodiments of the present invention allow for displaying parallel single instruction multiple threads (SIMT) and/or single instruction multiple data (SIMD) threads adjacently (e.g. horizontally side by side) for visualization of simultaneous instruction execution. Further, embodiments of the present invention allow displaying the order in which instructions are executed between warps and CTAs. Moreover, embodiments of the present invention allow for easier identification of concurrency bugs in programs (e.g., GPU assembly programs) by software developers.

Figure 2:
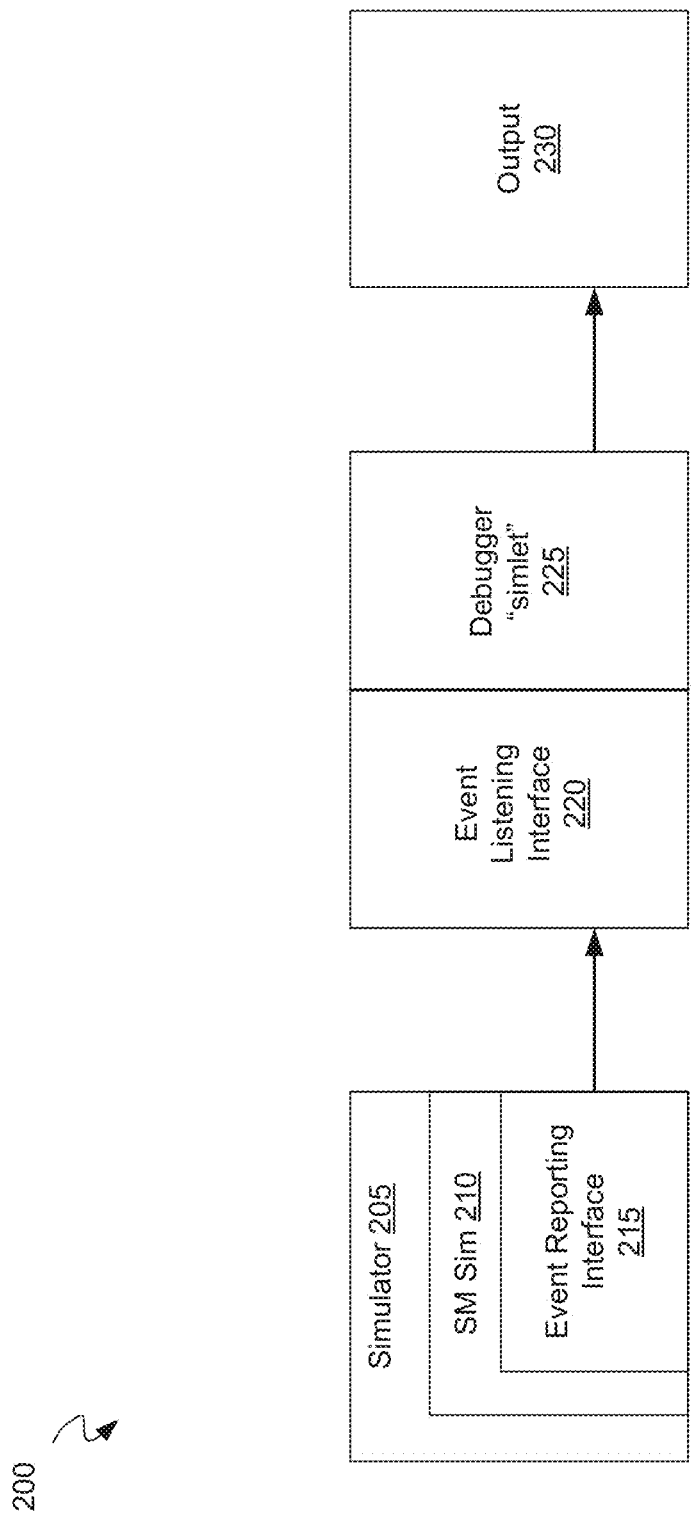
FIG. 2 is a block diagram view of an exemplary debugger program simulation, according to an embodiment of the present invention.

FIG. 2 is a block diagram view of an exemplary debugger program simulation 200, according to an embodiment of the present invention. A simulator 205 includes one or more SM simulators 210. The simulator 205 and/or SM simulator(s) 210 may be configured to simulate execution, by of one or more multi-threaded multi-core processors or processor cores, of programs or grids of CTAs. The SM simulator(s) 210 may include an event reporting interface 215. The event reporting interface 215 may be configured to provide data associated with the simulation executed by the SM simulator 210 (e.g., to an event listening interface 220).

In one or more embodiments of the invention, a tracker is configured to monitor execution of a set of programs each including a set of instructions executing interleaved with other instructions of the set of instructions. For example, in FIG. 2, the event listening interface 220 may operate as a tracker configured to monitor execution of a set of programs executed by the SM simulator 210. Each program can include a set of instructions executing interleaved with other instructions of the set of instructions. For example, the SM simulator 210 may execute a first instruction of a first program, then an instruction of a second program, then a second and third instruction of the first program, then an instruction of a third program, then a second instruction of the second program, then a fourth instruction of the first program, and so on.

In one or more embodiments of the invention, each of the set of instructions includes at least one operation operating on a set of threads. For example, referring to FIG. 6A, an "IMAD.U32.U32" instruction includes a "Read R0" operation, a "Read R1" operation, and a "Write R0" operation. In one or more embodiments of the invention, the at least one operation includes at least two threads. For example, each operation operates on 7 threads. In one or more embodiments, the threads of a warp are operated on in parallel.

In one or more embodiments of the invention, an aggregator is configured to organize a first set of instructions corresponding to a first program of the set of programs based on an execution order of the first set of instructions. For example, in FIG. 2, a debugger simlet 225 may operate as an aggregator configured to organize a first set of instructions corresponding to a first program of the set of programs. The debugger simlet 225 may organize the first set of instructions based on the execution order of the first set of instructions. In one or more embodiments of the invention, the aggregator is further configured to filter out instructions other than instructions in the first set of instructions. In one or more embodiments of the invention, the aggregator is further configured to gather operations only within the first set of instructions.

For example, returning to the example where the SM simulator 210 executes a first instruction of a first program, then an instruction of a second program, then a second and third instruction of the first program, then an instruction of a third program, then a second instruction of the second program, then a fourth instruction of the first program, and so on. The debugger simlet 225 may organize the first, second, third, and fourth instructions of the first program so that they are in the order of first, second, third, and fourth instruction.

Further, the debugger simlet 225 may organize the instructions without the instructions of other programs (e.g., the second and third programs) in between by filtering out instructions other than instructions in the first set of instructions and/or gathering operations only within the first set of instructions. The debugger simlet 225 may organize the instructions of the second program so that they are in the order of execution without the instructions of other programs (e.g., the first and third programs) in between. The debugger simlet 225 may similarly organize the instructions of all other programs.

In one or more embodiments of the invention, the at least one operation of the set of instructions executes interleaved with other operations of the set of instructions. In an example, a first operation of a first instruction may execute, then an operation of a second instruction may execute, then a second operation of the first instruction may execute. Referring to FIG. 6A, the "Read R0" operation of the "IMAD.U32.U32" instruction may execute, followed by the execution of at least one operation associated with a different instruction, then followed by the execution of the "Read R1" operation of the "IMAD.U32.U32" instruction.

In one or more embodiments of the invention, the aggregator is further configured to organize the first set of instructions based on an execution order of the operations. Continuing the example, the debugger simlet 225 may organize the first and second operations of the first instruction so that they are in the order of the first operation, second operation, and so on without the operations of other instructions (e.g., the second instruction) in between. The debugger simlet 225 may similarly organize the operations of all other instructions.

In one or more embodiments of the invention, the set of threads execute interleaved with other threads of the set of threads. In an example, a first thread of a first operation may execute, then a second thread of the first operation or a second operation may execute, then a second thread of the first operation may execute. Referring to FIG. 6A, the thread 0 of the "Read R0" operation may execute, followed by the execution of at least one thread of the "Read R0" operation or another operation, then followed by the execution of thread 1 of the "Read R0" operation.

In one or more embodiments of the invention, the aggregator is further configured to organize the first set of instructions based on an execution order of the set of threads. Continuing the example, the debugger simlet 225 may organize the first and second threads of the first operation so that they are in the order of the first thread, second thread, and so on without the threads of the first operation or a second operation in between. The debugger simlet 225 may similarly organize the threads of all other operations.

In one or more embodiments of the invention, an aggregator is configured to generate a result set representing the first set of instructions organized based on the execution order. For example, the debugger simlet 225 may be configured to generate output 230 that represents the first set of instructions organized based on the execution order. The output 230 may be in the form of a text file, a binary-encoded file, or any other format operable to store the result set.

In one or more embodiments of the invention, the aggregator is further configured to identify the set of threads corresponding to each at least one operation. For example, the aggregator is configured to monitor register and memory operations (e.g., reads and writes) to identify which thread and instruction each operation corresponds to.

In one or more embodiments of the invention, the aggregator is further configured to include in the result set, data associated with each of the set of threads, and associate the data with a corresponding operation in the result set. For example, referring to FIG. 6A, the aggregator may include in the result set data such as register values read or written, for each of the 7 threads. Further, the aggregator may associate such data with a corresponding operation by indicating which data for each thread is associated with which operation (e.g., that a value of "0x1" is associated with thread 1 of the "Read R1" operation of the "IMAD.U32.U32" instruction).

In one or more embodiments of the invention, a display is configured to display the result set. In one or more embodiments of the invention, the display is further configured to display data associated with the at least two threads adjacent to a representation of the at least one operation. For example, referring to FIG. 6A, the display may display the data corresponding to the 7 threads of the "Read R0" operation side by side. In the case of the "Read R0" operation, the data for threads 0-6 are all "0." The display may display the data corresponding to the 7 threads of the "Read R1" operation side by side. In the case of the "Read R1" operation, the data for threads 0-6 is "0," "0x1," "0x2," "0x3," "0x4," "0x5," "0x6," respectively.

As a result, a viewer of the display may easily understand the execution of a specific program and/or instruction for debugging purposes because instructions of a program may be organized next to each other (without intervening instructions of other programs), operations of the instructions may be organized next to each other (without intervening operations of other instructions), and threads of operations may be organized next to each other (without intervening threads of other operations). For example, FIG. 6D shows execution data organized so that intervening execution of instructions for other CTAs is removed or filtered out and only execution data for two instructions (e.g., ST.E.CG.64 and ST.E) for CTA 0 are shown.

In one or more embodiments of the invention, the aggregator and tracker may be the same and/or part of the same component. For example, the event reporting interface 215 and the event listening interface 220 are the same component. In one or more embodiments of the invention, the aggregator and tracker may not be the same and/or not part of the same component.

Figure 3:
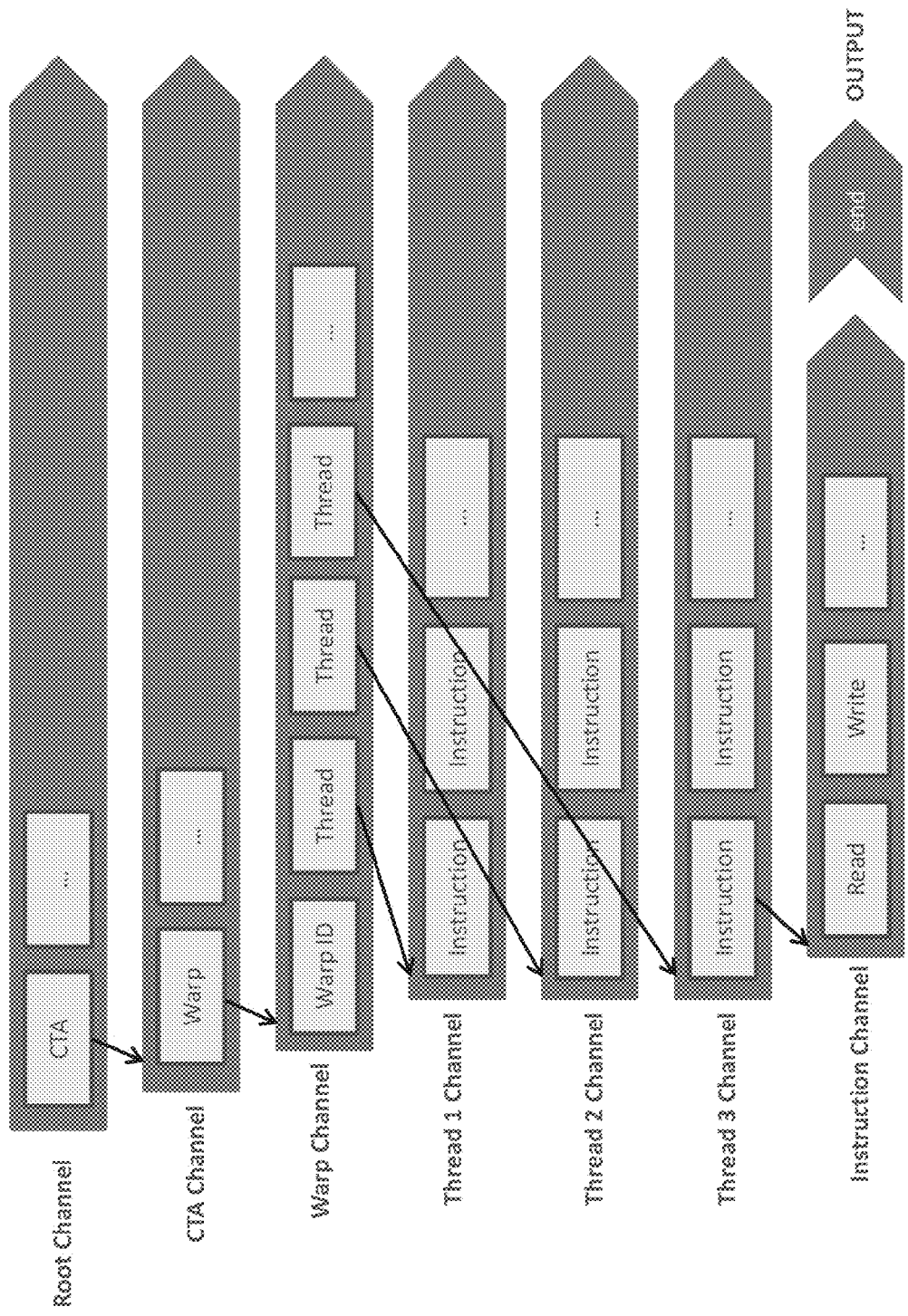
FIG. 3 shows an exemplary monitoring channel hierarchy of a debugger program simulation, according to an embodiment of the present invention.

FIG. 3 shows an exemplary monitoring channel hierarchy of a debugger program simulation, according to an embodiment of the present invention. In one or more embodiments of the invention, a multi-core processor may include multiple processing cores. Each processing core, or SM, may include one or more SMs, where each SM may execute one or more grids of CTAs or programs that may include CTAs. Each CTA may include one or more warps, where each warp includes one or more threads.

The monitoring channel may be run in the simulator 205 and/or SM simulator 210. The monitoring channel may run an execution of and/or monitor an execution of one or more CTAs. Because each CTA may include one or more warps, a CTA channel may include one or more warp channels corresponding to each warp in the CTA. Each warp channel may include a warp ID and one or more thread channels. Each of the thread channels may be associated with one or more instruction channels. For example, thread channels 1-3 each include multiple instruction channels representing instructions that correspond to the corresponding thread. Each instruction may include a corresponding instruction channel that includes operations of the instruction for the corresponding thread.

The event reporting interface 215 may monitor the instruction channels and send corresponding execution data as output to the event listening interface 220, which in turn sends the execution data to the debugger simlet 225. Alternatively, the event listening interface 220 may monitor the instruction channels and send corresponding execution data as output to the debugger simlet 225.

Figure 4:
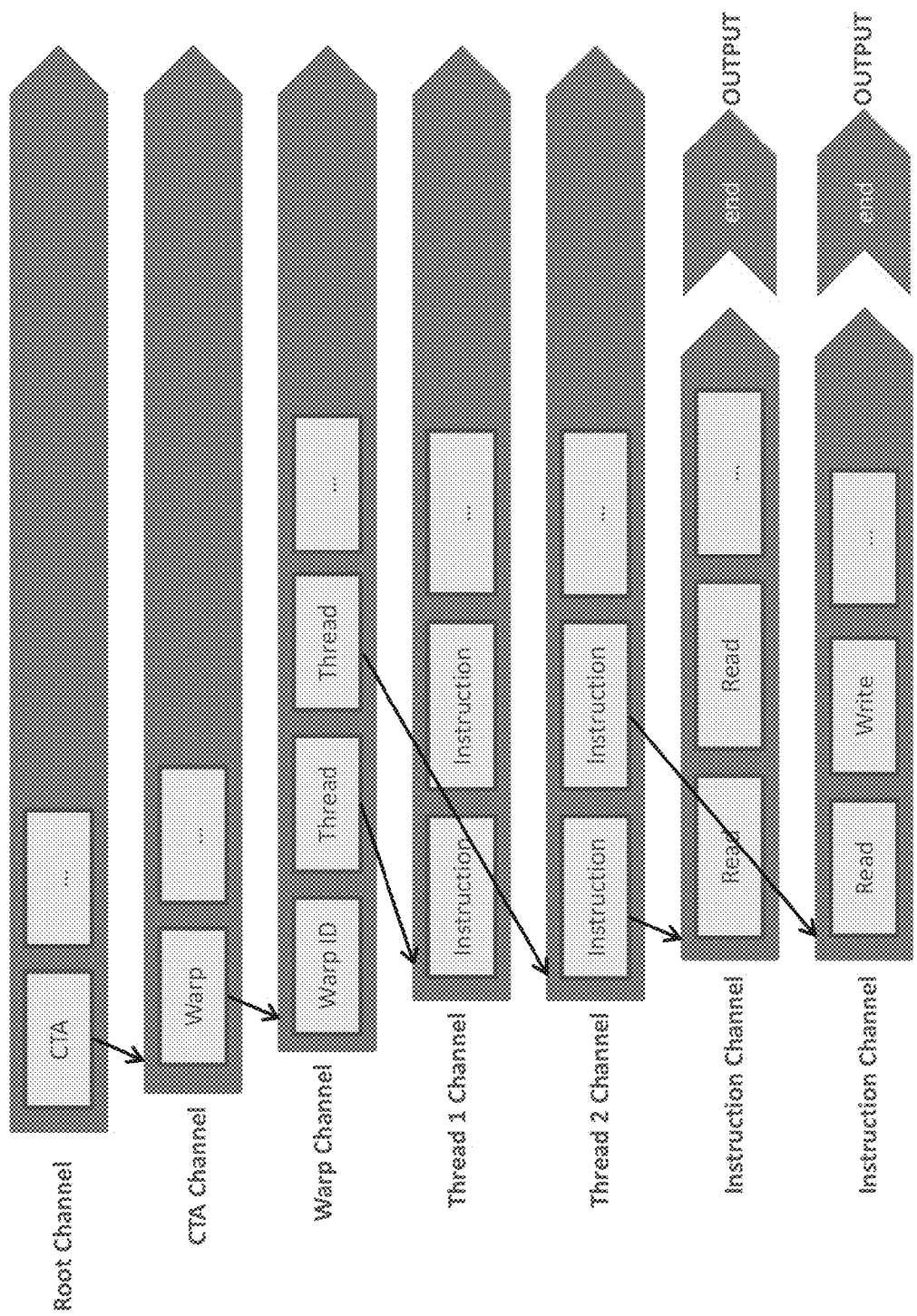
FIG. 4 shows an exemplary monitoring channel hierarchy of a debugger program simulation, according to an embodiment of the present invention.

FIG. 4 shows an exemplary monitoring channel hierarchy of a debugger program simulation, according to an embodiment of the present invention. FIG. 4 is similar to FIG. 3, but also shows more than one instruction channel corresponding to more than one instruction in the thread 2 channel. Each instruction channel provides output that may be received by the aggregator, event reporting interface 215, event listening interface 220, and/or debugger simlet 225.

Figure 5:
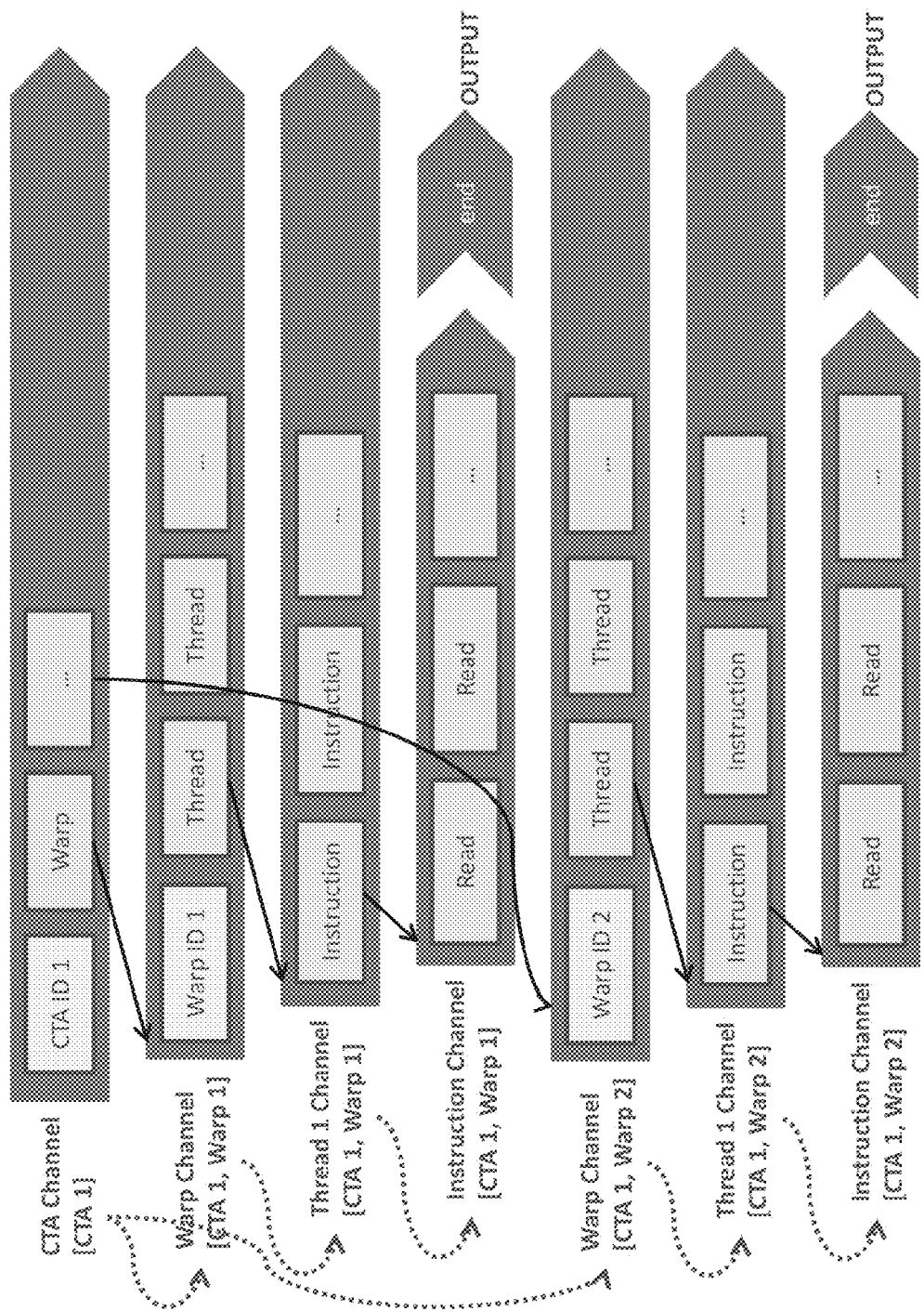
FIG. 5 shows an exemplary CTA channel of a debugger program simulation, according to an embodiment of the present invention.

FIG. 5 shows an exemplary CTA channel of a debugger program simulation, according to an embodiment of the present invention. The CTA channel may correspond to a CTA channel of FIGS. 3 and 4. The CTA channel may include a CTA ID and one or more warps. For example, the CTA channel includes warp ID 1 and warp ID 2. Each warp may include a corresponding warp channel that includes a warp ID and one or more threads. Each of the threads may include a corresponding thread channel that is associated with one or more instructions. For example, a thread channel 1 corresponding to CTA 1 and warp 1, and a thread channel 1 corresponding to CTA 1 and warp 2. Each instruction may include a corresponding instruction channel that includes operations of the instruction for the corresponding thread. Each instruction channel provides output that may be received by the aggregator, event reporting interface 215, event listening interface 220, and/or debugger simlet 225.

FIG. 6A shows exemplary output of a debugger program simulation, according to an embodiment of the present invention. As shown on the first line, an "IMAD.U32.U32" instruction included operations for a register transaction (e.g., read from registers R0 and R1 and write to register R0). The program counter is 00d060. The second and third lines show what values were read from registers R0 and R1, respectively, from all threads. The fourth line shows what was written to register R0 by all threads. In the example, these values are demonstrated in hexadecimal form. All lines of output may be prefixed with a CTA ID (e.g., an incremental counter) and a Warp ID.

It should be appreciated that any number of threads may be included for each operation and displayed. For example, while 7 threads are shown in the present example, 16, 32, or 64 threads could be shown.

FIG. 6B shows exemplary output of a debugger program simulation, according to an embodiment of the present invention. The example output shows the instruction, program location, and register and memory transactions for each thread in a warp. All lines feature the instruction context on the far left. In this case [c 4: w 0] represents CTA 4 and warp ID 0. The instruction start with a first line showing the instruction details from a program assembler. After the first line, the register reads and writes are displayed. For example, the second line shows that data is read from the R2 register (e.g., "Read R2"). From left to right, the first column of numeric data corresponds to thread 0 which read the value 0, the second column corresponds to thread 1 which read the value 0x8, the third column corresponds to thread 3 which read the value 0x10, the fourth column corresponds to thread 4 which read the value 0x18, and so on.

FIG. 6B also shows memory transactions in the last four lines (e.g., lines 5-8). The details of a memory transaction may be more complex to illustrate to a user than a register transaction. The address can be different for each thread when memory transactions are involved. Processor memory regions can be global, shared, or local. The transaction involves an address and the data currently residing at that address. The size of the transaction vary (e.g., from 1 byte to 16).

In FIG. 6B, each memory transaction may be shown as a pair of lines. The first line in the pair may show the address operated on by each thread. The second line in the pair may show the data at that address for each thread after the instruction is executed. If the transaction is greater than a predefined number of bits, then the display may show the output in a form similar to the output of multiple transactions. For example, the first line in the pair may show the address operated on by each thread. The second line in the pair may show the data at that address for each thread after the instruction is executed.

In this example, a 64-bit STS instruction is performed and the program counter is 00df68. Thread 0 writes to address 0x0 with an 64-bit value. The first four bytes of the write show in address 0x0 on the lines 5 and 6, and the last four bytes of the write show in address 0x4 on lines 7 and 8. It should be appreciated that vector stores and loads may be performed, allowing 32-, 64-, and 128-bit memory reads and writes.

FIG. 6C shows exemplary output of a debugger program simulation, according to an embodiment of the present invention. The far left context indicator includes a CTA ID, warp ID, a SM ID, and a clock value. The clock value is a clock value corresponding to an instruction issue time.

FIG. 6D shows exemplary output of a debugger program simulation, according to an embodiment of the present invention. Each instruction block is shown in its entirety before the next instruction is shown. In this example, an ST.CG.64 instruction in CTA 0, warp 0 is executed, followed by an ST.E instruction in the same CTA, but warp ID 1. If an instruction in another CTA were shown next, for example CTA 1 with warp ID 2, then the output would show [c 1: w 2].

Accordingly, execution data for each thread, warp, operation, instruction, CTA, program, and/or SM may be organized and displayed adjacent to other execution data for the same or other threads, warps, operations, instructions, CTAs, programs, and/or SMs. For example, execution data for all threads, warps, operations, and/or instructions of a particular CTA may be organized and displayed in their execution order without the inclusion of execution data for other threads, warps, operations, and/or instructions of other CTAs that may have executed interleaved with the threads, warps, operations, and/or instructions of the particular CTA.

Figure 7:
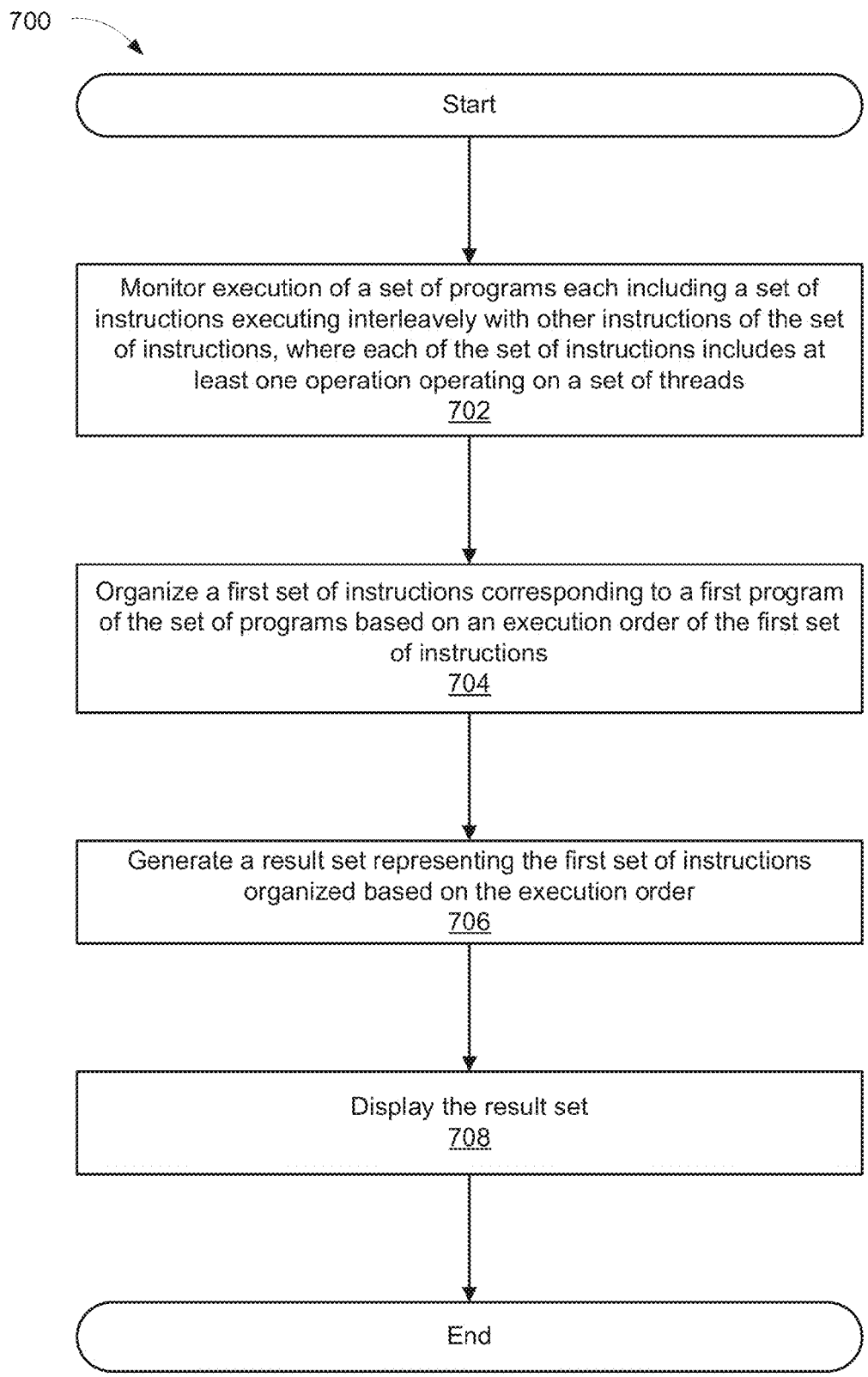
FIG. 7 depicts a flowchart of an exemplary computer-implemented process of organizing and displaying execution debugging data, according to an embodiment of the present invention.

FIG. 7 shows a flowchart 700 of an exemplary process of organizing and displaying execution debugging data. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 7 should not be construed as limiting the scope of the invention. Rather, it will be apparent to persons skilled in the relevant art(s) from the teachings provided herein that other functional flows are within the scope and spirit of the present invention. Flowchart 700 may be described with continued reference to exemplary embodiments described above, though the method is not limited to those embodiments In a block 702, execution of a set of programs each including a set of instructions executing interleaved with other instructions of the set of instructions is monitored, where each of the set of instructions includes at least one operation operating on a set of threads. For example, the simulator 205 and/or SM simulator 210 may execute a set of programs that include a set of instructions, where the instructions of the programs are executed interleaved with other instructions. The event reporting interface 215 and/or event listening interface 220 may monitor the execution.

In a block 704, a first set of instructions corresponding to a first program of the set of programs is organized based on an execution order of the first set of instructions. For example, the debugger simlet 225 may organize debugging execution data. The debugger simlet 225 may organize the execution data based on the execution order of the instructions, operations, and/or threads. For example, the debugger simlet 225 may maintain the execution order of the instructions, operations, and/or threads and filter out other instructions, operations, and/or threads.

In a block 706, a result set representing the first set of instructions organized based on the execution order is generated. For example, the debugger simlet 225 may generate a result set to be provided as output 230. In a block 708, the result set is displayed. For example, the result set may be sent to a display and/or a display may receive the result set for display.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method comprising:
   monitoring concurrent execution of a plurality of programs each comprising a corresponding plurality of instructions executing interleaved with other instructions of said corresponding plurality of instructions and other instructions of said plurality of programs, wherein each of said plurality of instructions comprises at least one operation operating on a plurality of threads;
   from a superset of instructions comprising instructions from said plurality of programs executing concurrently, organizing a first plurality of instructions corresponding to a first program of said plurality of programs based on a first execution order of said first plurality of instructions, and based on a second execution order of operations of a corresponding instruction in said first plurality of instructions, and based on a third execution order of threads of a corresponding operation in said corresponding instruction, wherein an instruction of said first program comprises one or more operations such that each operation is executed on two or more threads;
   generating a result set representing said first plurality of instructions organized based on said first, second, and third execution orders, wherein said result set comprises data resulting from execution of said first plurality of instructions such that first data is associated with a corresponding operation of a corresponding instruction in said result set; and
   displaying said result set.

2. The method of claim 1, wherein:
   said at least one operation of said plurality of instructions executes interleaved with other operations of said plurality of instructions; and
   said organizing further comprises organizing said first plurality of instructions based on an execution order of said operations.

3. The method of claim 1, wherein:
   said plurality of threads execute interleaved with other threads of said plurality of threads; and
   said organizing further comprises organizing said first plurality of instructions based on an execution order of said plurality of threads.

4. The method of claim 1:
   further comprising identifying said plurality of threads corresponding to each at least one operation; and
   wherein said generating further comprises, including in said result set, data associated with each of said plurality of threads, and associating said data with a corresponding operation in said result set.

5. The method of claim 1, wherein:
   said displaying said result set comprises displaying data associated with said at least two threads adjacent to a representation of said at least one operation.

6. The method of claim 1, wherein said organizing further comprises filtering out instructions other than instructions in said first plurality of instructions.

7. The method of claim 1, wherein said organizing further comprises gathering operations only within said first plurality of instructions.

8. A system comprising:
a processor;
a tracker configured to monitor concurrent execution of a plurality of programs each comprising a corresponding plurality of instructions executing interleaved with other instructions of said corresponding plurality of instructions and other instructions of said plurality of programs, wherein each of said plurality of instructions comprises at least one operation operating on a plurality of threads; and
an aggregator configured to:
from a superset of instructions comprising instructions from said plurality of programs executing concurrently, organize a first plurality of instructions corresponding to a first program of said plurality of programs based on a first execution order of said first plurality of instructions, and based on a second execution order of operations of a corresponding instruction in said plurality of instructions, and based on a third execution order of threads of a corresponding operation in said corresponding instruction, wherein an instruction of said first program comprises one or more operations such that each operation is executed on two or more threads; and
generate a result set representing said first plurality of instructions organized based on said first, second, and third execution orders for display on a display, wherein said result set comprises data resulting from execution of said first plurality of instructions such that first data is associated with a corresponding operation of a corresponding instruction in said result set.

9. The system of claim 8, wherein:
said at least one operation of said plurality of instructions executes interleaved with other operations of said plurality of instructions; and
said aggregator is further configured to organize said first plurality of instructions based on an execution order of said operations.

10. The system of claim 8, wherein:
said plurality of threads execute interleaved with other threads of said plurality of threads; and
said aggregator is further configured to organize said first plurality of instructions based on an execution order of said plurality of threads.

11. The system of claim 8, wherein said aggregator is further configured to:
identify said plurality of threads corresponding to each at least one operation; and
include in said result set, data associated with each of said plurality of threads, and associate said data with a corresponding operation in said result set.

12. The system of claim 8, wherein:
said display is further configured to display data associated with said at least two threads adjacent to a representation of said at least one operation.

13. The system of claim 8, wherein said aggregator is further configured to filter out instructions other than instructions in said first plurality of instructions.

14. The system of claim 8, wherein said aggregator is further configured to gather operations only within said first plurality of instructions.

15. A non-transitory computer-readable storage medium comprising a plurality of instructions configured to execute on at least one computer processor and comprising functionality to:
monitor concurrent execution of a plurality of programs each comprising a corresponding plurality of sub-instructions executing interleaved with other sub-instructions of said corresponding plurality of sub-instructions and other sub-instructions of said plurality of programs, wherein each of said plurality of sub-instructions comprises at least one operation operating on a plurality of threads;
from a superset of instructions comprising instructions from said plurality of programs executing concurrently, organize a first plurality of sub-instructions corresponding to a first program of said plurality of programs based on a first execution order of said first plurality of sub-instructions, and based on a second execution order of operations of a corresponding instruction in said first plurality of sub-instructions, and based on a third execution order of threads of a corresponding operation in said corresponding instruction, wherein an instruction of said first program comprises one or more operations such that each operation is executed on two or more threads;
generate a result set representing said first plurality of sub-instructions organized based on said first, second, and third execution orders, wherein said result set comprises data resulting from execution of said first plurality of sub-instructions such that first data is associated with a corresponding operation of a corresponding sub-instruction in said result set; and
display said result set.

16. The non-transitory computer-readable storage medium of claim 15, wherein:
said at least one operation of said plurality of sub-instructions executes interleaved with other operations of said plurality of sub-instructions; and
the plurality of instructions further comprise functionality to organize said first plurality of sub-instructions based on an execution order of said operations.

17. The non-transitory computer-readable storage medium of claim 15, wherein:
said plurality of threads execute interleaved with other threads of said plurality of threads; and
the plurality of instructions further comprise functionality to organize said first plurality of sub-instructions based on an execution order of said plurality of threads.

18. The non-transitory computer-readable storage medium of claim 15, wherein said plurality of instructions further comprise functionality to:
identify said plurality of threads corresponding to each at least one operation; and
include in said result set, data associated with each of said plurality of threads, and associate said data with a corresponding operation in said result set.

19. The non-transitory computer-readable storage medium of claim 15, wherein:
said plurality of instructions further comprise functionality to display data associated with said at least two threads adjacent to a representation of said at least one operation.

20. The non-transitory computer-readable storage medium of claim 15, wherein said plurality of instructions further comprise functionality to ignore instructions other than instructions in said first plurality of instructions.

\* \* \* \* \*